May 29, 1945.　　　　F. L. WHITE　　　　2,377,285
HOISTING BRAKE CONTROL
Filed Aug. 17, 1943　　　　2 Sheets-Sheet 2
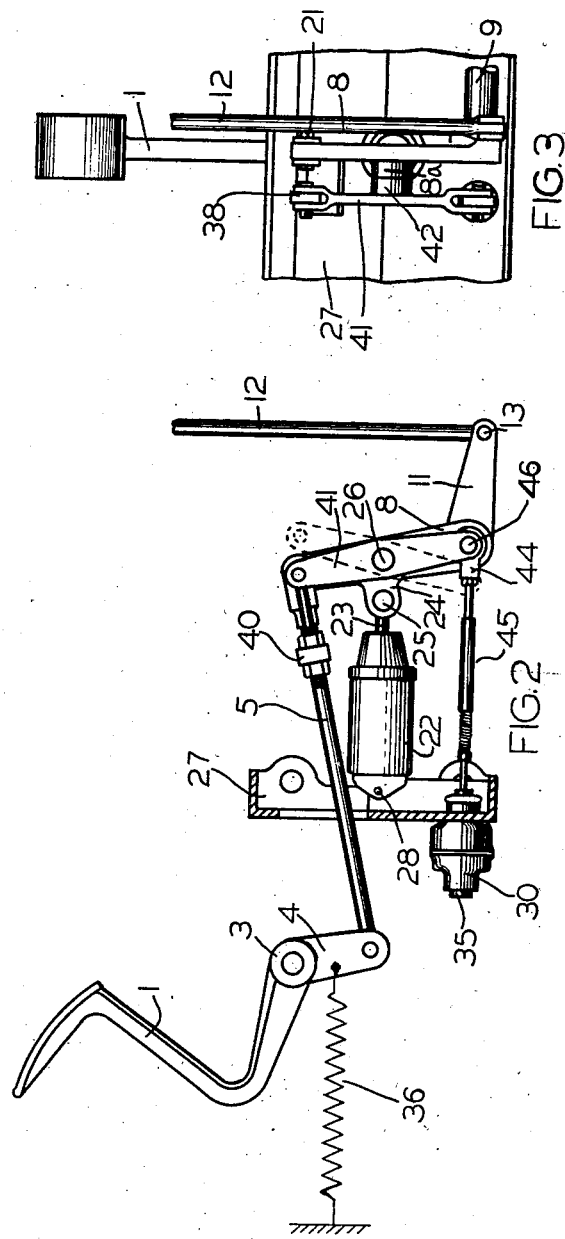
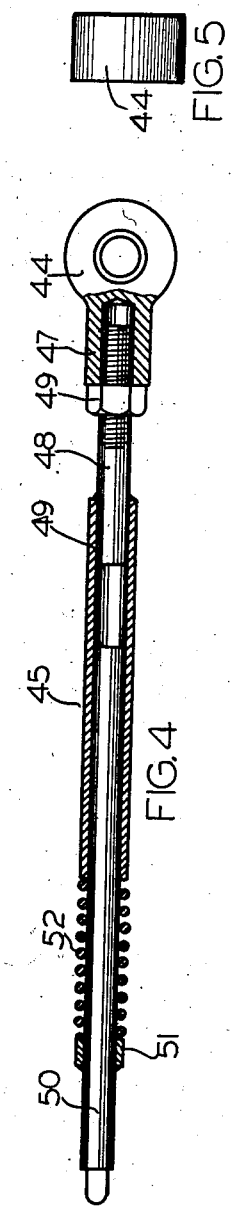
Inventor
FRED L. WHITE Patented May 29, 1945

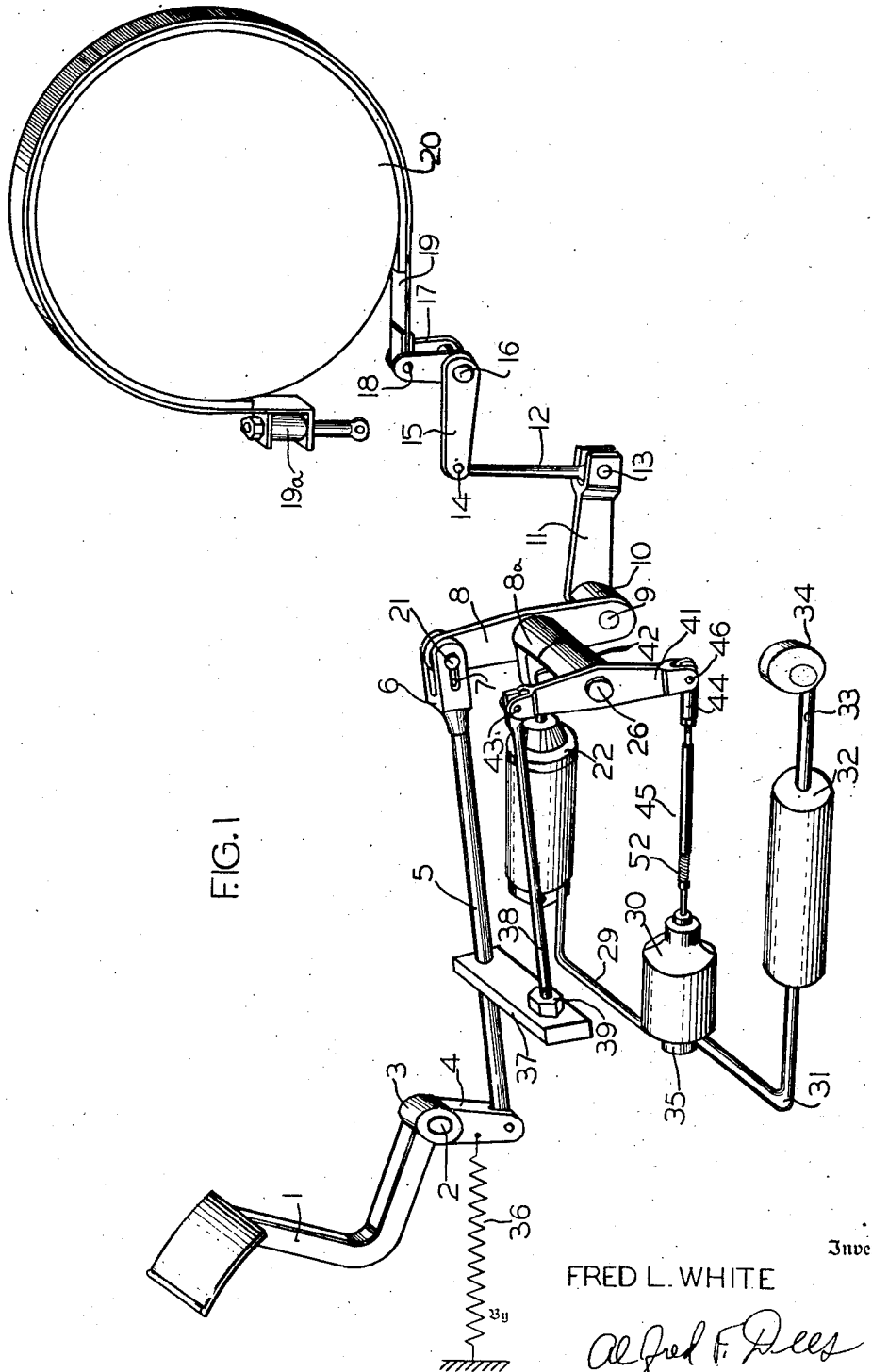

2,377,285

UNITED STATES PATENT OFFICE 2,377,285

HOISTING BRAKE CONTROL

Fred L. White, Marion, Ohio, assignor to The Osgood Company, Marion, Ohio, a corporation of Ohio Application August 17, 1943, Serial No. 499,028

14 Claims. (Cl. 188—151)

This invention is directed to a winch or winding drum mechanism for portable hoists or excavators and in its more specific aspects is related to a combined power and manual brake control for such winch or winding drums as applied to devices of the class defined.

The object of the invention is to provide in a brake control for the winding drum of a hoist or excavator combined manual and power operated brake actuating mechanisms in which the two mechanisms are mechanically linked.

Another object of the invention is to provide in a brake control for the winding drum of a hoist or excavator combined manual and power operated brake actuating mechanisms in which the two mechanisms are mechanically linked.

Another object of the invention is to provide a brake control for the winding drum of an excavator or hoist, a power actuating element for the brake, manually controlled and in which in the event of the power element's failure to apply the brake, the manual actuating element will immediately continue the applying of the brake.

A further object of the invention is to provide a foot pedal control for a power actuated brake applicable to the cable winding drum of a portable material handling device.

Another and further object of the invention is to provide a foot pedal actuated secondary control for a brake governing the application of a motor to the brake on a portable material handling device.

A still further object of the invention is the provision of a linkage mechanism in a brake applying mechanism that during the continued operation of a motor will cause said motor to apply the brake but in the event of motor failure will enable the manual control to take up the applying of the brake without any material slackening of the brake pressure on the brake drum.

Another and still further object of the invention is to provide a brake linkage common to both a manual and a power actuated mechanism and in which the power mechanism is controlled by said manual portion of the mechanism.

A still further object of the invention is to prevent a release of the brake in a power controlled brake applying mechanism by having the manual control continuing actuating the applying mechanism in the event of failure of the power applying mechanism.

Another further object of the invention is to provide a combined manual and power actuated brake control in which the two are so interlocked that the manual portion causes the power portion to act before the manual portion has advanced to the stage of actively applying the brake to a winding drum or winch of a portable material handling device.

Another and a further object of the invention is to provide a mechanically interlocked manual and motor operated brake applying mechanism for a reversely rotatable element in which the manual portion of the control preliminarily governs the motor portion of the control and in which the linkage is so organized that the motor will apply the brake before the manual portion engages the brake applying mechanism and further in the event of failure of the motor the manual portion will continue to actuate the brake applying mechanism.

Other and further objects of the invention are to increase the certainty of brake operation, manual or power; decrease the time necessary to fully apply the brake; increase the operating efficiency; decrease the amount of equipment necessary to control the brake by power-manual actuated means; decrease over all maintenance cost and initial cost of device; and to decrease the manual effort required to operate the brake or to hold the brake in the set or locked position.

Other and further objects of the invention will occur to those skilled in the arts to which this invention pertains as the description proceeds which taken in connection with the accompanying drawings sets forth a preferred embodiment thereof but such disclosure is not to be construed as a limitation of the invention which is limited only by the appended claims and any and all modifications, alterations and variations of structure coming within the spirit and scope thereof are deemed to be included herein.

In the drawings:

Fig. 1 shows a schematic and perspective view of a winding drum brake control.

Fig. 2 shows a side elevational view of the brake control mechanism.

Fig. 3 shows an end elevational view of the mechanism looking from the right of said figure.

Fig. 4 shows a detail view of the valve actuating rod.

Fig. 5 shows an end view of the device shown in Fig. 4.

The prior art has developed a wide variety of mechanisms employable for applying brakes to rotating elements including winches and winding drums on stationary as well as portable devices. For stationary devices the expedient of a mechanical multiplying linkage has frequently solved the problem whereby a small force applied to the hand or foot lever is multiplied several times in order that the necessary brake pressure will exist between brake drum and brake band. Physical limitations very frequently dictate the size of a brake drum that may be employed and then to secure the necessary braking force the unit pressure must be increased. This unit pressure is many times of such proportions that the usual multiplying linkage fails to multiply the manual force sufficiently to achieve effective braking. In some types of mechanisms, especially the automotive, this has been overcome by a vacuum booster but this expedient too, has its limitations. In many installations the manual force applying mechanism is eliminated and replaced with a motor mechanism and as long as there is no power failure it is a highly satisfactory expedient but when the safety of heavy loads or expensive devices is dependent upon the brake such a failure may prove highly dangerous and costly. Frequently a power brake was applied to one end of a drum and a hand brake to the other end but then in the event of failure on the power or motor operated unit the hand brake was not readily accessible to speedily apply the brake and damage to the load or machine or both resulted before the hand brake was set or applied. Applicant has therefore developed a linkage which relies primarily on a motor actuated linkage but this is so interconnected with the manual actuating mechanism that in the event of failure in the motor system the manual mechanism comes into brake applying condition instantly. The manual mechanism moreover directly controls the power or motor system and in the event of motor failure a continued application of the manual portion of the control will take over the application of the brake. The two systems are dependent upon one another but it is possible to employ the manual brake applying mechanism should the power or motor system become inactive. It is thus seen that the operator has at his instant command an adequate motor actuated brake applying mechanism and secure in the knowledge that should it fail, the manual control takes over immediately without any time lapsing between the time the power fails and the manual control is effective.

The above objects and advantages are embodied in the mechanism set forth in the attached drawings in which 1 is the usual foot actuated control pedal pivotally supported on a shaft or pin 2 arranged in an enlarged boss portion 3 on the pedal 1 and conveniently supported in the deck or upper body (not shown) of a portable hoist or excavator. Rigidly secured to the foot pedal 1 on the enlargement 3 is a lever element 4 that is adapted to rotate with pedal 1 about the pin 2.

Pivotally secured to lever 4 is a connecting rod or linkage 5 that has an enlarged double eye fitting 6 secured to the rod 5. The fitting or eye piece 6 has an elongated slot 7 formed therein. Eye piece 6 is intended to cooperate with one end of a lever 8 having a pin 21 therein slidable in slot 7 and pivoted about a pin 9 rigidly fixed or supported on the aforesaid deck or upper body. The lever 8 may be provided with a boss 10 to which is secured one end of a lever 11 with the other end of lever 11 provided with a double eye. Pivotally secured to the eye end formed on lever 11 is another connecting rod or linkage 12 by means of a pin 13 and the other end of rod 12 is connected by a pin 14 to one arm of a bell crank comprising a lever 15 rigidly supported on a pin 16. Pin 16 is likewise appropriately mounted on the aforesaid deck or upper body. Rigidly secured to the pin 16 and rotatable therewith is a double lever 17 having a pin 18 about which is secured one end of a brake band 19 that surrounds brake drum 20 schematically represented. The brake drum is intended to be secured to and is actually a continuation of a winch or winding drum of a portable hoist or excavator or any other similar device. The other end of the brake band is held in an extensible fixture 19a supported on a deck or upper body adjacent the brake drum. It should be apparent that the movement of pedal 1 about pin 2, lever 8 about pin 9, and lever 15 about pin 16 will apply or contact the brake band 19 about the brake drum 20 and hold or retard the rotation of the latter. The terms brake drum and winch as employed in this case are to be construed as a two part common element.

Previously it was indicated that means have been developed and provided for applying force to brake band 19 from a motor or power source thereby relieving the operator of the necessity of applying the necessary force thereto and confining his energies to governing the opening and closing of a valve and said valve controlling a motor that supplies the necessary power to rotate lever 8 about pin or shaft 9 thereby applying the necessary force to brake band 19 about the drum 20. Means are further provided in the linkage thus far described that enable the operator to manually apply force to the brake band 19 in the event of failure of the pressure fluid system or as it would normally manually operate. This provides a continuous positive control of the brake and at no time is the brake system and linkage out of control. The brake system is therefore definite and certain at all times with a consequent increase in the efficiency and reliability of the device. This constitutes an important factor in the manipulation of excavator hoists, draglines, etc. and in fact to any other rotating mechanism to which the device of the instant invention may be applicable because the failure of braking of the winches or winding drums on those devices would be very disastrous.

The motor controlled system for applying or contracting brake 19 about the winch or winding drum 20 originates in a motor 22 whose piston rod 23 is pivotally connected to an eye 24 provided on the lever 8 or to a collar 8a associated with a pin 26 fixed to lever 8 as by threading it therein. Collar 8a could with equal propriety be a boss on lever 8 and function with equal facility. As shown the eye 24 is associated with 8a and pin 25 connects the eye formed on rod 23 with the eye 24. The other end of the motor 22 is pin connected to frame 27, only a portion of which is shown. The left end of motor 22 is appropriately extended and apertured to fit a portion of frame 27 and pin 28 permits the pivoted movement of motor 22 with respect to the frame because the relative movement of rod 23 in urging lever 8 forward will cause it to move vertically, therefor requiring a pivoting movement of the motor with respect to the frame supporting same.

Motor 22 has a conduit 29 connected thereto that leads to one side of a valve 30 appropriately secured to the frame 27. This valve is in the nature of a throttle adapted to regulate the flow of pressure fluid to the motor 22 and is of the metering type, the pressure varying in accordance with the pressure applied by the operating means.

Conduit 31 is connected to the other side of valve 30 and leads to a pressure fluid storage reservoir 32 connected to an appropriate pump 34 by conduit 33. Motor 22 is preferably of the single acting type and retraction of the brake is preferably accomplished by extensible element 19a which incorporates a spring element (not shown) and another spring 36 restores pedal or manual means 1 to its original position following each brake application and also aids in the retraction of plunger 23 in motor 22 by reason of the latter's direct mechanical connection to lever 8. In the loose or withdrawn position of pedal 1 and brake 19a motor 22 is connected to the atmosphere through exhaust conduit 35 in order that the linkage may retract. The particular pressure fluid employed in the instant case is air by reason of its ready accessibility.

The valve 30 is controlled by manual or foot pedal 1 and in order to accomplish the actuation of the valve there is provided a bracket or bar 37 rigidly secured to linkage rod 5 to which is secured another rod 38 in a substantially parallel relation thereto by threading it therein in an appropriate aperture. A lock nut 39 is shown to lock the rod in any adjusted position. A coupling arrangement 40, as shown in Fig. 2, may be employed in substitution of the lock nut or in addition thereto in order to vary the effective length of the rod 38.

Rotatably disposed upon pin 26 is a lever 41 that may have a boss 42 as shown abutting the collar or boss 3a to maintain a spaced relationship between the lever 41 and lever 8. Lever 41 is exactly the same length as lever 8 and is pivoted at the center on pin 26. Pin 43 is in line with pin 21 and pin 45 is in line with pin 9. Both ends of lever 41 may be slotted and one of these ends adapted to receive the flattened end of rod 38. All elements are drilled and a pin 43 pivotally associates these elements. The other slotted end of lever 41 receives the eye end 44 of an extensible contractible and adjustable length rod 45. A pin 46 associates the rod 45 with the lever 41 and the other end of the rod 45 is connected to the stem or plunger (not shown) of valve 30.

Rod 45 comprises a plurality of elements some of which telescope with respect to each other. The eye piece 44 has an extension 47 that is bored and threaded. A rod or screw element 48 is threaded into the extension 47 and a nut 49 locks the two parts 48 and 47 in any adjusted position. The smooth end of rod 48 is fitted into a sleeve 49 and these parts may be welded together if desired or otherwise rigidly connected.

Another rod 50 has a collar 51 rigidly secured thereto as by welding and its other end is telescopically engaged in tube 49. The end on which collar 51 is fastened directly engages with the stem or plunger of valve 30 and spring 52 is interposed between the collar 51 and one end of the sleeve 49. Valves similar to 30 customarily have an internal spring (not shown) that normally tends to move the valve plunger or slide to closed position. The parts 50 and 49 of rod 45 telescope because any excess movement over that necessary to open the valve 30 is taken up by the spring 52. The first axial movement of rod 45 will open the valve but many times more movement is imparted than necessary and in order not to damage the valve 30 spring 52 takes up this movement and allows parts 50 and 49 to telescope. Spring 52 is normally of a higher gage than the valve spring previously referred to and will always open the valve upon the first movement thereof and when pressure is released on the spring it will allow the reclosing of the valve.

The operation of the above described system is as follows: Manual means or foot pedal 1 is depressed against the tension of spring 36 that moves rod 5 axially of itself within the limit of slot 7 in which pin 21 slides. Since rod 38 is rigidly linked to rod 5 it will immediately axially move rod 38 and thereby rotate lever 41 about pin 26 to a position approximating the dotted line position of Fig. 2. Rotation of lever 41 will immediately axially move rod 45 opening valve 30. The opening of valve 30 will admit pressure fluid to the motor 22 and axial motion of plunger 23 against lever 8 which acts directly against pin 26 will urge lever 8 forward about pin 9 as a pivot. This lever will continue its forward motion until it assumes a position substantially coplanar with lever 41 pivoting lever 8 thereby applying brake 19 to drum 20. When this position is reached rod 45 will have expanded to its original length and it will allow valve 30 to close therefore completely shutting off pressure fluid from the motor 22. As long as lever or pedal 1 is held in a given position the aforementioned action will occur. Under normal operating conditions motor 22 will respond well in advance of pin 21 engaging the end of slot 7. Release of pedal 1 will restore the entire system to the position indicated in Fig. 1.

In the event of power or pressure fluid failure there will be no danger of an unapplied brake because continued forward or axial movement of the rod 5 will cause the end of slot 7 to engage pin 21 whereupon the rod 5 will pivot lever 8 and apply brake 19 to the drum 20.

It is evident therefore that a means has been provided whereby a pressure fluid or power system is applied to a brake linkage subject to a manual control and that in the event of failure in the power system the manual portion will be enabled to immediately take up braking beyond the point where the lost motion connection 7, 21 has been taken up. The winding drum and in fact any other rotatable or movable element to which it is applied will therefore always be subject to a braking action because the two portions, the manual and the power, function interdependently. One portion is responsive to the other but the manual portion will always take up whenever the power operated portion fails.

That which is regarded new, novel and useful and which is sought to be protected by Letters Patent of the United States is as follows:

1. In a brake controlling means for a winding drum; a rotatable element about which a brake element is disposed; a manual means to apply said brake; a power means to apply said brake; means including a valve controlled by said manual means to govern the action of said power means; means common to said manual and said power means to transmit the motion originating in said manual and said power means; means connecting said common means and said brake, said means including a device for producing relative movement between said manual and said power operated means, a lever on said common means rotatable relative to said common means upon the occurrence of said relative movement to thereby close said valve opened by said manual means and causing said power operated means to actuate said brake and said common means before said manual means acts on said brake and said common means; and said valve closed by said power means when a brake setting is accomplished in accordance with the movement of said manual means.

2. In a brake control; a rotatable element; a brake associated with said element; a manual control means for said brake; a motor control for said brake; a common means associated with said manual and said motor means; means connecting said common means with said brake; valve means connected to said manual means by means of a rotatable lever mounted on said common means to control said motor operated means; said manual means adapted to move relatively of said common means a predetermined amount thereby opening said valve and enabling said power means to apply said brake; said manual means actuating said brake when said power means is ineffective; and said valve closed by said power means when a brake setting is accomplished in accordance with the movement of said manual means.

3. In a brake linkage; a rotatable element; a brake associated with said element; a manual actuating means operatively associated with a pivoted first lever; means connecting said lever and said brake; said manual means having lost motion connection with said lever; a motor operated means; a second lever pivoted to said first lever; said motor operated means associated with said second lever; means connecting said manual means and said second lever; a control element for said motor means; means connecting said control element and said second lever; and said manual means upon actuation operating said control means before reaching the limit of said lost motion, pivoting said second lever and actuating said control thereby energizing said motor means and pivoting said first lever to actuate said brake and simultaneously restoring said control to substantially its original position.

4. In a brake control; a rotatable element; a brake for said element; a foot pedal control; a pivoted first lever; means connecting said foot pedal and said first lever including a lost motion connection between said first lever and said means; a second lever pivoted to said first lever; a motor operatively associated with said first lever to pivot same; means connecting said means and said second lever; a control for said motor; extensible means to connect said second lever and said control; and said foot pedal upon actuation pivoting said second lever on said first lever, actuating said control and causing said motor to apply said brake; said extensible means acting to restore said control to its original condition and thereby arresting motion of said motor.

5. In a brake control; a rotatable element; a brake associated with said rotatable element to arrest or retard rotatable movement thereof; a manual element to control the application of said brake; a reciprocating pressure fluid motor; an element common to said manual element and said motor and operatively associated therewith; said manual element including a lost motion connection; means connecting said common element and said brake; a second means operatively associated with said common means including a lever rotatable with respect thereto; means connecting said manual element and one end of said lever; a valve to control said motor; means connecting the other end of said lever and said valve; and said manual element opening said valve, thereby energizing said motor to apply said brake and said manual element applying said brake when said motor is inoperative and after the limit of said lost motion connection has been reached.

6. In a brake control; a movable element; a brake applied to said element; a manually actuated control; a linkage connecting said brake to said control and including a pivoted element; a motor to move said linkage and apply said brake; said motor and said manual control operative on said pivoted element interposed in said linkage; a second element adapted for movement relative to said pivoted element; said manual control having a lost motion connection with said pivoted element; a controller for said motor; and means connecting said second element and said manual control; means connecting said controller and said second element; said manual means actuating said control before it reaches the limit of said lost motion connection and applying said brake upon the inability of said motor to apply same to said movable element.

7. In a combination manual and motor operated brake control; a rotatable element; a brake for said element; a manual controller for said brake; a motor controller for said brake; a linkage connecting said controller and said brake including a pivoted lever; said manual controller having a lost motion connection with said pivoted lever; a controller for said motor; a second lever pivoted on said first mentioned lever; means connecting said manual controller and said second lever; means connecting said second lever and said controller; said manual means pivoting said second lever with respect to said first mentioned lever thereby actuating said controller and causing said motor to pivot said first mentioned lever and actuating said brake; and said motor controller restored to its original position after movement of said brake and arresting motion of said motor.

8. In a combined manual and motor control for a brake; a winding drum; a brake to be applied to said drum; a manual controller; a pressure fluid operated motor controller; a pivoted first lever; means including a lost motion connection connecting said manual controller and said first lever; said motor operatively connected to said first lever; means connecting said pivoted lever and said brake; a second lever pivoted to said first lever and normally disposed in substantially the same plane as said first lever; means connecting said manual controller and said second lever; a valve for said motor; means connecting said valve and said second lever; said second lever pivoting on said first lever upon actuation of said manual controller, opening said valve; said motor applying said brake by pivoting said first lever and restoring both levers to substantially the same plane, thereby closing said valve and arresting motion in said motor; and said lost motion connection causing said motor to operate but upon continued movement of said manual controller when the motor is inoperative applying said brake to said drum.

9. In a brake control for a rotatable element; a winding drum; a brake for said winding drum; a foot pedal control; a pressure fluid motor control; each of said controls connected to a pivoted element, and said connection for said foot pedal including a lost motion connection; a lever rotatably mounted on said element; means connecting said foot pedal and said element; a valve to control said motor; an extensible linkage connecting said element and said valve; and means connecting said pivoted element and said brake; said foot pedal upon being depressed rotating said lever relative to said pivoted element thereby opening said valve; and said motor then pivoting said element to actuate said brake and rotate it relative to said lever, closing said valve and arresting motion of said motor.

10. In a brake control; a winding drum and a brake operatively associated; a manual control for said brake; a pressure fluid motor control for said brake; means connecting said controls and said brake including a pivoted element, said manual means including a lost motion device; a member adapted for rotation relative to said pivoted element; means connecting said manual means and said member; a valve to control said pressure fluid motor; an extensible linkage connecting said valve and said member; and said manual means upon actuation rotating said member relative to said pivoted element within the limits of said lost motion device, and opening said valve thereby actuating said motor, pivoting said element and rotating same relative to said member, said motor reclosing said valve thereby stopping the motion of said motor, said extensible linkage allowing relative motion between said member and said valve to compensate any excess motion between the two before the closing of said valve.

11. In a brake control; a combination winding drum and brake assembly; means to control the application of said brake including a manual control and a motor control, said controls operatively connected to a pivoted element included in said means, the connection between said manual means and said pivoted element including a lost motion device; a controller for said motor; a member rotatably supported on said pivoted member; means connecting said manual means and said member; an extensible linkage connecting said controller and said member; and said manual means rotating said member adjusting said controller to energize said motor and said motor moving said pivoted element and reversely rotating said member on said pivoted element to stop said motor; said extensible linkage causing a predetermined relative movement between said motor controller and said member.

12. In a brake control; a rotatable element; a brake operatively associated therewith; a pivoted lever; a linkage connecting said lever and said brake; a pressure fluid motor to pivot said lever and apply said brake; a foot pedal means operatively connected to said lever, including a lost motion device; a metering valve to govern the admission of pressure fluid to said motor; a second lever pivoted to said pivoted lever, both levers lying normally in the same plane; means connecting said second lever and said foot pedal means; means connecting said metering valve and said second lever; said foot pedal upon being depressed opening said valve before the limit of said lost motion device is reached and said motor pivoting said pivoted lever and applying said brake; said motor coming to rest when said pivoted lever and said second lever have been placed in substantially the same plane.

13. In a brake control for a rotatable element; the combination; a brake element engaging a rotatable element; a first pivoted lever having a second lever pivoted on said first lever; a linkage connecting said brake and said first lever; a foot pedal having a bar associated therewith connected to said first lever, the point of connection between said bar and first lever comprising a lost motion connection; a pressure fluid motor connected to said first lever; a metering valve to govern the flow of pressure fluid to said motor; a second bar connected to said first bar and to said second lever; means connecting said valve and said second lever; and said last mentioned means including telescoping elements to absorb any motion in excess of that required to open said valve, said valve opening before the limit of motion of said lost motion is reached admitting pressure fluid to said motor and causing said motor to apply said brake.

14. In a combination manual and power brake; a movable element; a brake to be applied to said element; a first pivoted lever and a second pivoted lever normally lying in substantially the same plane; means connecting said brake and said first lever; a manual brake applying means including a lost motion connection operatively associated with said first lever; a motor operatively associated with said first lever; a metering valve for said motor; means associated with said manual means to open said valve and operable through said second pivoted lever; said levers pivoting relatively of each other upon the opening of said valve and lying in substantially the same plane in the advanced pivoted position after the valve has been closed by said motor by pivoting said first lever to apply said brake.

FRED L. WHITE..